United States Patent [19]

Lindell

[11] Patent Number: 4,850,635
[45] Date of Patent: Jul. 25, 1989

[54] VEHICLE COVER KIT

[76] Inventor: George Lindell, 5722 W. Vernon, Phoenix, Ariz. 85035

[21] Appl. No.: 154,029

[22] Filed: Feb. 9, 1988

[51] Int. Cl.[4] .......................................... B60J 11/00
[52] U.S. Cl. ..................................................... 296/136
[58] Field of Search ................ 296/136, 98; 150/52 K

[56] References Cited

U.S. PATENT DOCUMENTS

| | | | |
|---|---|---|---|
| 1,999,171 | 4/1935 | Bryant | 135/5 |
| 2,646,097 | 7/1953 | Gaverth et al. | 150/52 |
| 3,222,102 | 12/1965 | Lucas | 296/136 |
| 3,563,594 | 2/1971 | London | 293/3 |
| 4,174,134 | 11/1979 | Mathis | 296/137 |
| 4,432,581 | 2/1984 | Guma | 296/136 |
| 4,657,298 | 4/1987 | Yong | 296/136 |
| 4,718,711 | 1/1988 | Rabbit | 296/136 |

FOREIGN PATENT DOCUMENTS 2641411  3/1978  Fed. Rep. of Germany ...... 296/136

Primary Examiner—Robert R. Song
Attorney, Agent, or Firm—Jordan M. Meschkow; Don J. Flickinger; Lowell W. Gresham

[57] ABSTRACT

A protective cover assembly for covering the vehicle's passenger compartment includes a roller and sheet material wound on the roller and having one end fixed thereto. The other end of the sheet material is coupled to a rod which may be removably placed beneath the vehicle's windshield wipers. Handle means are coupled to the roller for unrolling the sheet material over the passenger compartment and toward the rear thereof. The sheet material is folded such that when unfolded, first and second flaps cover the first and second sides of the passenger compartment. Fastening means are provided either fixed to the sheet material or capable of being fixed to the sheet material to enable the formation of folds at the corners of the sheet material so as to tailor the cover to the general size and shape of the passenger compartment.

14 Claims, 2 Drawing Sheets

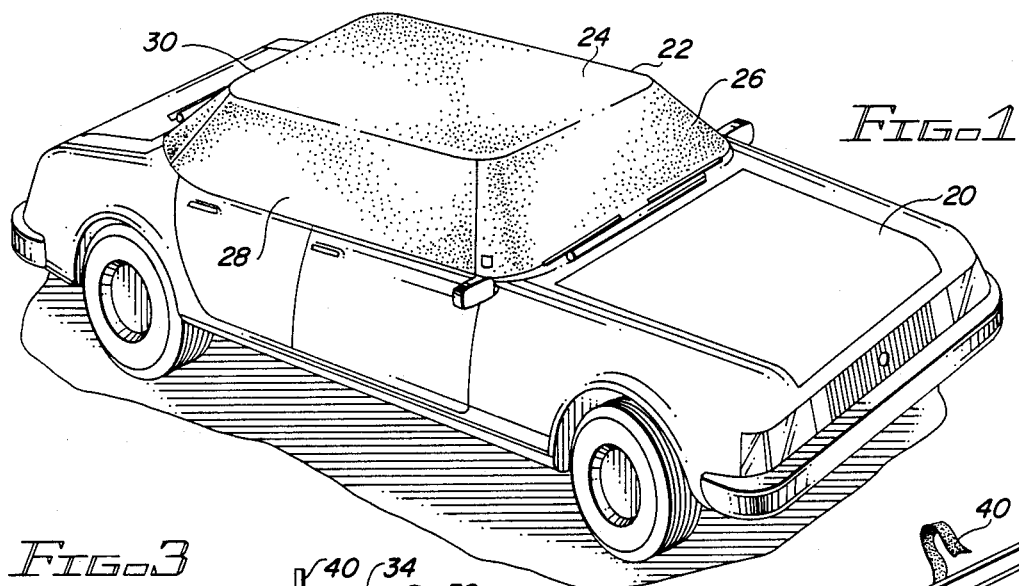
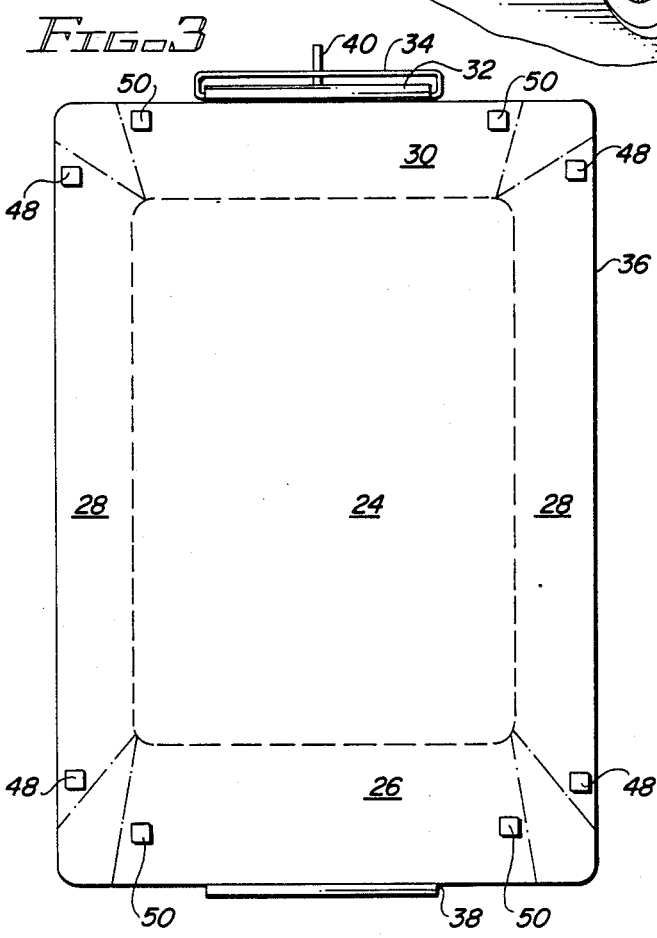
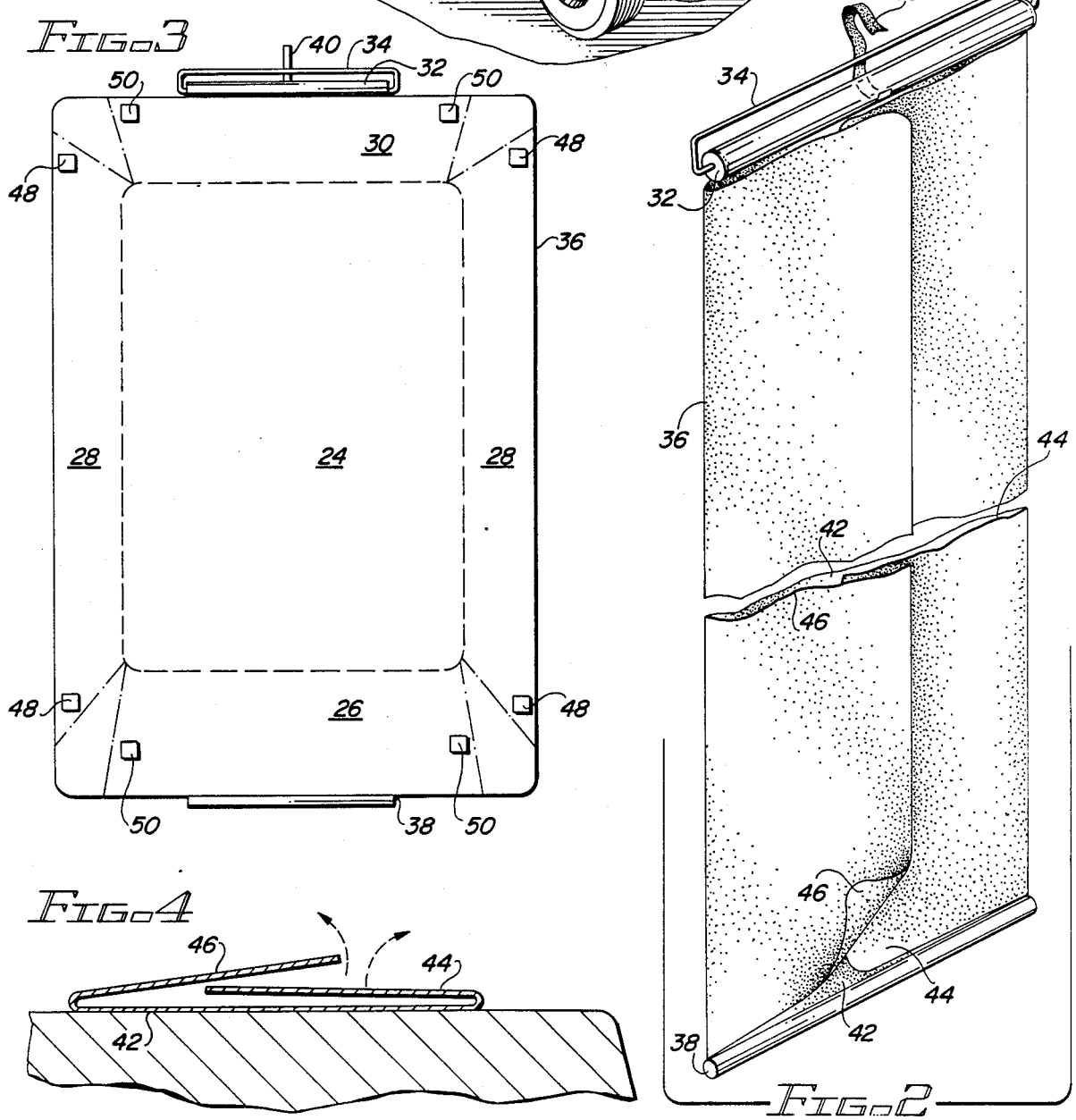
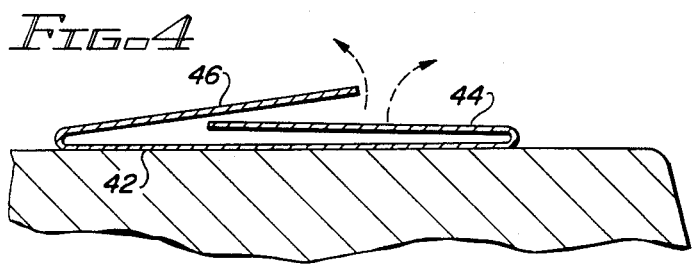

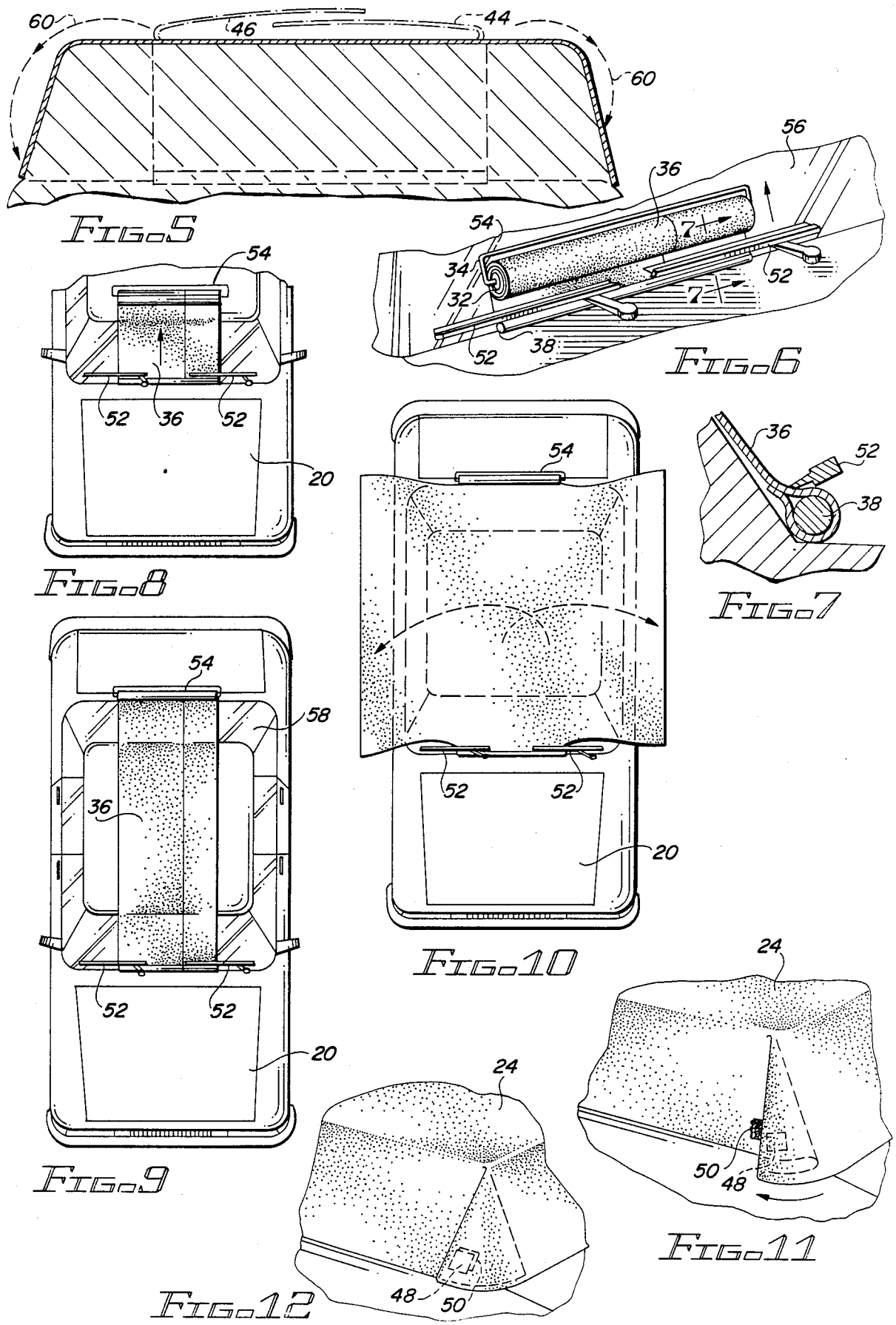

VEHICLE COVER KIT

BACKGROUND OF THE INVENTION

1. Field of the Invention

This invention relates generally to a vehicle cover assembly and, more particularly, to a portable apparatus for covering a passenger compartment of a vehicle including means for tailoring the cover to the general size and shape of the passenger compartment.

Nature has always created problems for the owners of vehicles which are left outdoors. In the winter, it is not uncommon for snow and ice to accumulate on the passenger compartment, especially the windows thereof, requiring the operator to brave the elements and clear the windows. In the summertime, the sun shining on the vehicle could cause the temperature within the vehicle to rise dramatically. Furthermore, the sun's hot rays are extremely damaging to the interior portions of the passenger compartment (e.g. the dashboard, upholstery, etc.).

For these and other reasons, car covers, consisting primarily of fabric or plastic shaped to the form of the particular vehicle, have been developed and are now commonly used. Such covers are typically stored in the trunk of the vehicle in a folded condition and then taken out and spread over the vehicle. While such covers do provide protection, they have several drawbacks. First, the cover must be manually placed on the vehicle, manually removed, and manually folded. This procedure is time consuming and difficult, especially in the case of larger vehicles.

As a result of the disadvantages associated with the vehicle covers described in the previous paragraph, extending and retracting vehicle covers have been developed, and the prior art is replete with examples of such. For example, see U.S. Pat. Nos. 2,646,097; 4,174,134; 4,432,581; and 4,657,298. Unfortunately, such prior art devices are complex and difficult to install, generally requiring semi-permanent fixture to the vehicle.

SUMMARY OF THE INVENTION

It is an object of the present invention to provide an improved vehicle cover.

It is a further object of the present invention to provide a vehicle cover kit which includes means for tailoring the cover to the general size and shape of the passenger compartment of the vehicle.

It is a still further object of the present invention to provide an improved vehicle cover which can be fully extended or rolled up into a compact form and stored in a container.

A still further object of the present invention is to provide an improved vehicle cover which is simple and easy to use.

A still further object of the present invention is to provide an extending and retracting vehicle cover which does not require fixture to the vehicle.

According to a broad aspect of the invention there is provided a protective cover for covering a vehicle,s passenger compartment, which compartment is comprised of a front, a rear, and first and second sides. The front portion of the passenger compartment includes a windshield and windshield wiper. The inventive cover assembly includes a roller and sheet material wound on the roller and having first and second ends, the first end being fixed to the roller. The second end of the sheet material is coupled to a rod which may be removably placed beneath the windshield wipers. Handle means are coupled to the roller for unrolling the sheet material over the passenger compartment to the rear thereof. The sheet material has first and second longitudinal folds therein forming first and second folded portions or flaps which, when unfolded the cover covers the first and second sides of the passenger compartment. The sheet material is generally rectangular having four corners and includes fastening means coupled proximate each of the corners for forming tucks at each corner so as to conform the sheet material to the general shape of the passenger compartment. These fasteners may be provided separately and placed on the sheet material by the owner so as to tailor the cover to the specific shape and size of his vehicle.

BRIEF DESCRIPTION OF THE DRAWINGS

The above, and other objects, features and advantages of the present invention will be more clearly understood from the following detailed description taken in conjunction with the accompanying drawings, in which:

FIG. 1 is a perspective view of an automobile having the passenger compartment thereof covered with the inventive vehicle cover;

FIG. 2 illustrates the inventive vehicle cover in an unrolled configuration;

FIG. 3 is a plan view of the inventive vehicle cover in an unrolled and unfolded configuration;

FIG. 4 is a cross-sectional view illustrating the sheet material of the inventive vehicle cover in a folded configuration;

FIG. 5 illustrates how the sheet material of the inventive vehicle cover can be unfolded to cover the sides of the vehicle's passenger compartment;

FIGS. 6 and 7 illustrate how the inventive vehicle cover is restrained by the vehicle's windshield wipers;

FIGS. 8, 9 and 10 are top views illustrating the inventive vehicle cover in various stages of deployment; and FIGS. 11 and 1 2 illustrate how the corners of the sheet material of the inventive vehicle cover may be fastened to customize the vehicle cover to the general shape and size of the passenger compartment of the vehicle.

DETAILED DESCRIPTION OF THE PREFERRED EMBODIMENT

FIG. 1 illustrates an automobile 20 having the inventive car cover 22 disposed over the passenger compartment. As can be seen, car cover 22 includes a top portion 24, a front portion 26, first and second side portions 28 (only one of which is shown), and a rear portion 30.

Referring to FIG. 2, the inventive vehicle cover comprises a roller 32 of the window shade variety rotatably mounted on a wire handle portion 34. A first end of a sheet material (e.g. canvas, plastic, etc.) 36 is fixedly coupled to roller 32. A second end of sheet material 36 is fixedly coupled to plastic rod 38. When not being used, sheet material 36 is completely rolled on roller 32 bringing rod 38 into juxtaposition with roller 32. A strip 40 has one end fixedly coupled proximate the end of sheet material 36 which is connected to roller 32. Strip 40 becomes exposed only when sheet material 36 is fully unwound. Strip 40 is provided with fasteners or a fastening material such as Velcro which is comprised of a plurality of hook-and-loop fasteners such that strip 40 may be wrapped around handle 34 and secured to itself.

This will prevent any undesired rerolling of the sheet material 36 on to roller 32.

As can be seen from FIG. 2, the sheet material is folded so that it comprises a base portion 42, a first fold 44 and a second fold 46.

FIG. 3 illustrates the inventive vehicle cover in its fully extended and unfolded configuration. As can be seen, rod 38 resides at one end of the sheet material and roller 32, handle 34 and strip 40 reside at the other end of sheet material 36.

In its fully extended and unfolded configuration, the sheet material comprises a first section 24 for covering the top of the passenger compartment, a front section 26 for covering the windshield, a rear portion 30 for covering the rear window portion, and first and second sections 28 for covering the side portions of the passenger compartment.

Also shown in FIG. 3 are a plurality of male fasteners 48 and a plurality of female fasteners 50. In each case, a male/female fastener pair is positioned proximate each corner of the rectangular sheet material 36. These fasteners may be of the hook-and-loop type commonly referred to as Velcro. The fasteners may be sewn or otherwise fixedly coupled to sheet material 36. After the sheet material is disposed on the passenger compartment, the corners of the sheet material may be folded and tucked as is shown in FIG. 11 and secured as is shown in FIG. 12. In this manner, the vehicle cover will more closely contour the shape of the vehicle's passenger compartment. Alternatively, the fasteners may be provided separately and be of the type which comprises an adhesive backing. In this case, after the sheet material is disposed on the passenger compartment, the user may appropriately place the fasteners on the sheet material so as to customize or tailor the sheet material to closely contour or fit over the passenger compartment of his particular vehicle.

In order to deploy the inventive vehicle cover, the vehicle cover with the sheet material rolled up is removed from the trunk or passenger compartment and rod 38 is placed beneath windshield wipers 52 as is shown in FIGS. 6 and 7. Roller assembly 54 comprised of handle 34, roller 32 and sheet material 36 rolled thereon resides on the vehicle's windshield 56 just above windshield wipers 52. Handle 34 is then gripped by the user and pulled upward and rearward over the passenger compartment as is shown in FIG. 8. This is continued until handle assembly 54 rests proximate the lower portion of the vehicle's rear widow 58. A cross-section of the sheet material at this point is as shown in FIG. 4. That is, base 42 resides on the top of the passenger compartment with folds or flap portions 44 and 46 ready to be unfolded as is shown in FIG. 5 by arrows 60 so as to cover and protect the side windows of the passenger compartment. From the top, the unfolded sheet material 36 will now appear as it does in FIG. 10

By utilizing fasteners 48 and 50 as was described above in conjunction with FIGS. 11 and 12, the sheet material may be tailored to the general shape and size of the passenger compartment.

Thus it has been shown and described a vehicle cover kit for protecting the passenger compartment of a vehicle. The inventive vehicle cover is not only simple and easy to use, but requires no permanent fixturing to the vehicle itself.

The above description is given by way of example only. Changes in form and details may be made by one skilled in the art without departing from the scope of the invention as defined by the appended claims.

I claim:

1. A protective cover assembly for covering a vehicle's passenger compartment, which compartment is comprised of a front, rear, and first and second sides, said front including a windshield and windshield wipers, said assembly comprising:
   a roller;
   a sheet material wound on said roller and having first and second ends, said first end fixed to said roller;
   means for anchoring said second end of said sheet material to said windshield wipers; and
   handle means coupled to said roller for unrolling said sheet material over said passenger compartment and toward the rear thereof.

2. A protective cover assembly according to claim wherein said sheet material has first and second longitudinal folds therein forming first and second folded portions which, when unfolded, cover said first and second sides.

3. A protective cover assembly according to claim 2 wherein said sheet material when unfolded is generally rectangular having four corners.

4. A protective cover assembly according to claim 3 further comprising fastening means coupled proximate each of said four corners for forming tucks in said sheet material to conform said sheet material to the shape of said passenger compartment.

5. A protective cover assembly according to claim 4. wherein said roller is a spring biased roller.

6. A protective cover assembly according to claim 4 further comprising restraining means coupled to said second end for engaging said handle means when said sheet material is unrolled to prevent said sheet material from rolling up when said handle means is released.

7. A protective cover assembly according to claim 4 wherein each of said fastening means comprises a pair of hook and-loop fasteners.

8. A protective cover assembly kit for covering a vehicle's passenger compartment, which compartment is comprised of a front, a rear, and first and second side portions, said front including a windshield and windshield wipers and said first and second side portions including side windows, said kit comprising:
   a roller;
   a sheet of material wound on said roller and having first and second ends, said first end fixed to said roller, said sheet having first and second longitudinal folds forming first and second folded portions, the width of said sheet being less than the length of said roller when said sheet is folded along said longitudinal folds, and being sufficiently wide to fully cover said side windows in said first and second sides of said passenger compartment when said sheet is unfolded, the length of said sheet when fully unwound being sufficient to fully cover the front and rear of said passenger compartment and substantially less than the end-to-end length of said vehicle;
   means for anchoring said second end of said sheet material to said windshield wipers; and
   handle means coupled to said roller for unrolling said sheet material over said passenger compartment and toward the rear thereof.

9. A kit according to claim 8 wherein said sheet material when unfolded is generally rectangular.

10. A kit according to claim 9 further comprising restraining means coupled to said second end for engaging said handle means when said sheet material is unrolled to prevent said sheet material from rolling up when said handle means is released.

11. A kit according to claim 10 wherein said roller is rotatably mounted on said handle means.

12. A kit according to claim 8 wherein said means for anchoring said second end of said sheet material to said windshield wipers comprises a rod coupled to said second end of said sheet material, said rod for removable placement under said windshield wipers.

13. A kit according to claim 8, further comprising adjustment means for adjusting the dimensions of said sheet material to enable the size and shape of said cover to be tailored to the size and shape of said passenger compartment.

14. The kit according to claim 13, wherein said adjustment means comprise a plurality of hook-and-loop fasteners which may be affixed to said sheet material at variable locations proximate said corners to enable the formation of tucks in said sheet material.

* * * * *